Aug. 24, 1954  A. CARDUNETS TALLADA  2,687,014
ROTARY HYDRAULIC COUPLING AND CLUTCH

Filed Nov. 22, 1950  2 Sheets-Sheet 1

INVENTOR:
A. CARDUNETS TALLADA
ATTORNEYS

Aug. 24, 1954

A. CARDUNETS TALLADA 2,687,014

ROTARY HYDRAULIC COUPLING AND CLUTCH

Filed Nov. 22, 1950

INVENTOR
A. CARDUNETS TALLADA
By Wenderoth, Lind & Ponack
ATTORNEYS

Patented Aug. 24, 1954

2,687,014

UNITED STATES PATENT OFFICE 2,687,014

ROTARY HYDRAULIC COUPLING AND CLUTCH

Alejandro Cardunets Tallada, Barcelona, Spain, assignor of one-half to Federico Delclaux Capilla, Barcelona, Spain Application November 22, 1950, Serial No. 196,977

Claims priority, application Spain November 29, 1949

2 Claims. (Cl. 60—54)

My invention relates to an hydraulic gear for the progressive changing of speeds. The speed-changing gear construction comprises in coacting combination a ring gear, gear carrier, satellite gears in gear pockets of a gear carrier which effectively form a gear pump and sets of impeller and turbine blades which interact to assist the transmission of torque from the input shaft of the gear construction to the output shaft thereof. The impeller and turbine blades function as a fluid coupling to provide additional transmission of power from the input shaft to the output shaft. The mechanism functions as a gear clutch in accordance with the degree of slip between these two shafts and the amount of fluid passing from the pressure side to the suction side of the pumps of the gear clutch. Clutch control is provided for the change speed of the driven shaft up to the speed of the driving shaft. This gear thus proves very useful for the driving of machines that have to work at different speeds, and can be applied specially and very extensively in connection with motor cars and other vehicles.

This gear comprises an internal toothed crown coupled to one of the driving or driven shafts and a central body or frame joined to the other shaft and having mounted on it one or more satellite pinions that constantly gear into the toothed crown. Each of these pinions forms, together with the toothed crown, a gear pump that makes the liquid circulate, and the frame that bears the pinions forms for each pinion a suction chamber and a pressure chamber for the liquid driven by the movement of the toothed crown and the pinion.

These suction and pressure chambers are connected with each other by a pipe or conduit that closes the circulation of the liquid, and in which there is interposed a valve or throttle that controls the passage of the liquid, so that by varying the position or the opening of this throttle the speed of the driven shaft is changed.

In the improved type of construction of this gear two series of blades, impeller blades and turbine blades, are carried, respectively, by the frame that bears the satellites and is fixed to the driven shaft, and by a part that forms a solid piece with the toothed crown and is fixed to the driving shaft. These blades correspond to each other like those of a turbine, and when the driving shaft revolves, they contribute to the transmission of power from this same driving shaft to the driven shaft. The impeller blades and turbine blades serve as a hydraulic coupling to effect a cushioned start to the driven shaft before the gear clutch is put into operation, that is, when the valves which control the amount of fluid from the pressure to the suction side of the pumps of the gear clutch are by-passed to produce this operation. In like manner, the impeller blades and turbine blades operate to provide a cushioned braking when the gear pumps are completely by-passed and the driven shaft tends to overrun. In this latter operation, the pressurizing of the fluid which is supplied at the inlets of the gear pump prevents the cavitation therein.

An object of the invention is to provide a progressive hydraulic speed-changing gear comprising in combination a ring gear, an input shaft, a plate fixed to said input shaft and supporting said ring gear, a head fixed to the edge of said ring gear and forming with said plate and said gear a closed chamber, said chamber revolving with said input shaft, a gear carrier located in said closed chamber and fixed to an output shaft, a plurality of satellite gears journalled in pockets in said gear carrier, each satellite gear forming with said ring gear a gear pump, blade means carried by said closed chamber and by said gear carrier, said pockets and said chamber being filled with liquid, said blade means comprising a first series of impeller blades fixed to the inside of said closed chamber and a second series of turbine blades fixed on the outside of said gear carrier and facing the impeller blades, the interaction between said impeller blades and said turbine blades assisting in the transmission of torque from the input shaft to the output shaft.

In the attached drawings an example of the gear of this invention is shown.

Figure 1:
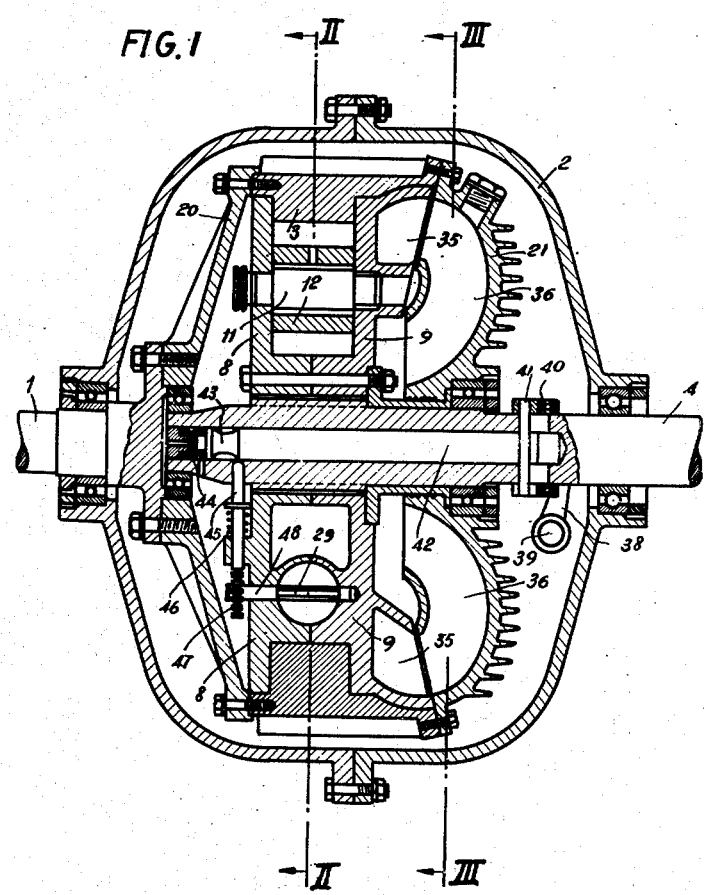
Figure 1 is an axial section of the construction of the gear.
Figure 2:
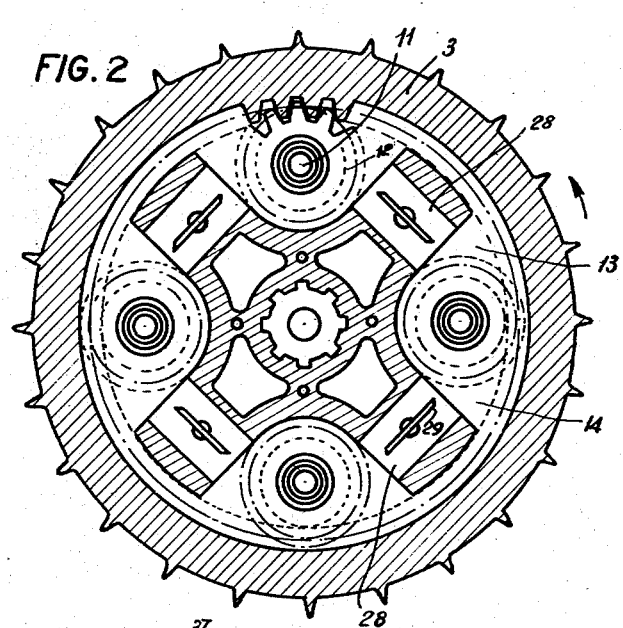
Figure 2 is a transverse section through the line II—II of Figure 1.
Figure 3:
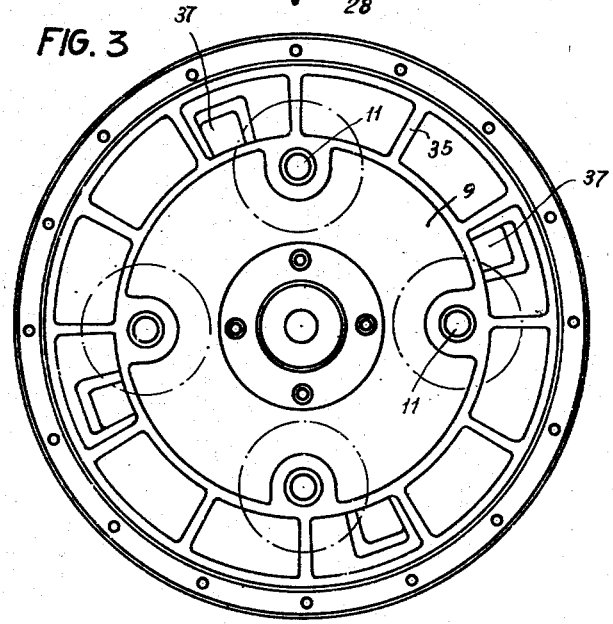
Figure 3 is a transverse section through the line III—III of Figure 1, with the head or right hand side of the case of the toothed crown removed.

In Figures 1 to 3 the device is shown, in which the transmission of power from the driving to the driven shaft is improved by means of a series of blades, coupled, respectively, to the driving and the driven shafts and which, acting like a turbine, contribute to the transmission of power.

In this construction the driving shaft I has permanently fixed to it a plate 20 that supports the toothed crown 3, and a head 21 is fitted onto the edge of the said crown, which head 21, together with the crown and the plate 20 form a closed chamber that revolves with the driving shaft 1 and inside which the driven shaft 4 resting on suitable bearings revolves. Inside the case 3, 20, 21 there is, permanently fixed onto the driven shaft 4 a frame formed by the two plates 8, 9 that bear the axles 11 of the satellite pinions 12. The whole mechanism is enclosed in an outer covering or case 2, that has been omitted in Figures 2 and 3 to simplify the drawings.

As shown in the figures, the satellite pinions 12 form gear pumps with the toothed crown 3, gear pumps, so that when the mechanism is turning in the direction of the arrow in Figure 2, each pinion helps to define a suction chamber 13 and a pressure chamber 14.

In body portions 8 and 9, between adjacent pumps, conduits 28 are provided that bring the pressure chamber of one pump into communication with the suction chamber of the neighbouring pump, and throttles are provided in these conduits 28. The throttle may consist of flap or butterfly valves 29, all of which may be manipulated at the same time from the outside of the mechanism.

The plate 9 of the frame or body portion 8, 9 has on its outer face a series of turbine blades 35 and on the inside of the head 21 there is provided another series of impeller blades 36. These blades face in the same direction as the blades of a turbine, so that when the head 21 revolves with the driving shaft, the centrifugal force acts on the liquid contained in the closed chamber and develops a certain pressure that is directed by the impeller blades 36 in such a manner that it acts on the turbine blades 35 of the frame 8, 9, thus contributing to the transmission to the said frame 8, 9 and therefore to the driven shaft 4, of the rotating movement of the driving shaft.

At suitable intervals between the turbine blades 35 there are openings 37 that communicate with the suction chambers 13 so that the pressure developed by the blades 36 and 35 is also transmitted to the suction chambers 13 and acts on the pinions of the gear pumps causing them to act as motors and thus contribute to the transmission of power from the driving to the driven shaft. Thus the yield of the gear is considerably improved in all those cases in which the driven shaft revolves at a lower speed than the driving shaft.

The throttle devices 29 all work together by means of a suitable mechanism governed by an outside control. In this present form of construction this mechanism consists of a lever 38 fixed onto an axle 39 that is worked from the outside by any suitable kind of control. This lever 38, formed in the shape of a fork, moves a ring 40 and makes it slide on the driven shaft 4, and this same ring 40 causes, by means of a taper-pin 41, a piston 42 to slide in a bore of the shaft 4, the end 43 of the piston being elongated as to form a cam surface as shown in the drawing.

The piston 42 is constantly pushed against the lever 38 by the action of a spring 44 and its end 43 acts on a series of pistons 45 moved by springs 46 and whose ends 47 are turned in the form of a rack that gears into teeth in the end of the axle 48 of the throttles 29. The cam surface 43 forces pistons 45 radially outward against opposing springs 46, causing the throttles 29 to revolve. In this way simultaneous control is obtained from outside the gear case over the position of the throttles 29 for opening or closing the passage of the liquid through the conduits 28.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A progressive hydraulic speed-changing gear comprising in combination a ring gear, an input shaft, a plate fixed to said input shaft and supporting said ring gear, a head fixed to the edge of said ring gear and forming with said plate and said gear a closed chamber, said chamber revolving with said input shaft, a gear carrier located in said closed chamber and fixed to an output shaft, a plurality of satellite gears journalled in pockets in said gear carrier, each satellite gear forming with said ring gear a gear pump, blade means carried by said closed chamber and by said gear carrier, said pockets and said chamber being filled with liquid, said blade means comprising a first series of impeller blades fixed to the inside of said closed chamber and a second series of turbine blades fixed on the outside of said gear carrier and facing the impeller blades, the interaction between said impeller blades and said turbine blades assisting in the transmission of torque from the input shaft to the output shaft.

2. A progressive hydraulic speed-changing gear comprising in combination a ring gear, an input shaft, a plate fixed to said input shaft and supporting said ring gear, a head fixed to the edge of said ring gear and forming with said plate and said gear a closed chamber, said head revolving with said input shaft, a gear carrier located in said closed chamber and fixed to an output shaft, a plurality of satellite gears journalled in pockets in said gear carrier, each satellite gear forming with said ring gear a gear pump, blade means carried by said closed chamber and by said gear carrier, said pockets and said chamber being filled with liquid, said blade means comprising a series of impeller blades fixed to the inside of said closed chamber and a series of turbine blades facing said impeller blades and which are fixed on the outside of said gear carrier, the interaction between said impeller blades and said turbine blades assisting in the transmission of torque from the input shaft to the output shaft, and a plurality of fluid passages in the wall of the gear carrier between the turbine blades, each of said passages communicating with the inlet chamber of one of the gear pumps.

References Cited in the file of this patent

UNITED STATES PATENTS

| Number | Name | Date |
|---|---|---|
| 1,806,652 | Sperry | May 26, 1931 |
| 1,912,323 | Taylor | May 30, 1933 |
| 2,482,313 | Bascle | Sept. 20, 1949 |

FOREIGN PATENTS

| Number | Country | Date |
|---|---|---|
| 408,584 | Great Britain | Oct. 10, 1932 |